(12) United States Patent
Bui (10) Patent No.: US 7,124,964 B2
(45) Date of Patent: Oct. 24, 2006

(54) NOZZLE WITH FLOW RATE AND DROPLET SIZE CONTROL CAPABILITY

(76) Inventor: Quy Duc Bui, 13222 Crusheen Ct., Rosemount, MN (US) 55068

( * ) Notice: Subject to any disclaimer, the term of this patent is extended or adjusted under 35 U.S.C. 154(b) by 3 days.

(21) Appl. No.: 10/662,066

(22) Filed: Sep. 12, 2003

(65) Prior Publication Data

US 2004/0069875 A1    Apr. 15, 2004

Related U.S. Application Data (60) Provisional application No. 60/410,377, filed on Sep. 13, 2002.

(51) Int. Cl.
*B05B 1/26* (2006.01)
(52) U.S. Cl. .................. 239/519; 239/533.14; 239/546
(58) Field of Classification Search ........... 239/533.14, 239/519, 513, 502–504, 516, 546, 576, 533.13
See application file for complete search history.

(56) References Cited

U.S. PATENT DOCUMENTS

| | | | |
|---|---|---|---|
| 3,214,102 A | | 10/1965 | Meyer |
| 3,612,409 A | | 10/1971 | Henning |
| 3,711,020 A | * | 1/1973 | Zelna .............................. 239/1 |
| 3,990,640 A | * | 11/1976 | Laauwe ................... 239/533.1 |
| 4,618,101 A | | 10/1986 | Piggott |
| 5,134,961 A | | 8/1992 | Giles et al. |
| 5,908,161 A | | 6/1999 | Womac et al. |
| 6,126,088 A | | 10/2000 | Wilger et al. |

* cited by examiner

*Primary Examiner*—Christopher Kim
(74) *Attorney, Agent, or Firm*—Oppenheimer Wolff & Donnelly LLP (57) ABSTRACT

A flexible, self-adjusting flow nozzle is provided, optimally configured for agricultural uses. The nozzle flexes automatically in response to changes in fluid pressure, thereby maintaining an optimal droplet size and spray area for a variety of flow rates. The self-adjusting characteristic of the nozzle allows for the creation of a fully or semi-automatic spray system. The fully automatic system uses a GPS receiver to compare actual geographic data against a predetermined flow plan for automatically making adjustments to flow rate in order to accommodate both speed changes and varying crop needs. The semi-automatic system uses a manually controlled flow rate but utilizes the self-adjusting capabilities of the spray nozzle.

13 Claims, 6 Drawing Sheets

NOZZLE WITH FLOW RATE AND DROPLET SIZE CONTROL CAPABILITY

CROSS REFERENCE TO RELATED APPLICATIONS

This application claims priority to provisional application Ser. No. 60/410,377, filed on Sep. 13, 2002, entitled VARIABLE FLOW RATE NOZZLE.

BACKGROUND OF THE INVENTION

The subject invention is directed to a spray nozzle for controlling flow rate in precision spray applications. The spray nozzle is intended for use in a wide variety of agricultural, industrial, and residential applications.

Figure 1:
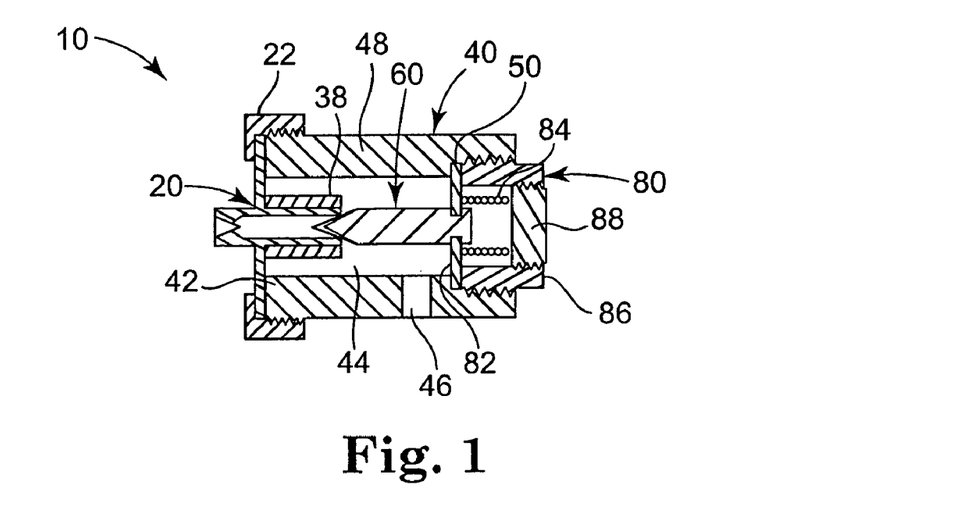

Agrochemicals are applied to agricultural fields to control pests and to enrich the soil with nutrients. Typically, these agrochemicals are mixed with water and sprayed over a field. The efficacy of an agrochemical spray depends on various spray variables such as flow rate, droplet size, spray distribution, and the speed of the applying vehicle. Heretofore, control over these variables has been limited.

Typically, the flow rate of a spray is determined according to the general requirement of an entire field. For example, if a pesticide is being applied, a high flow rate is chosen for a field having a relatively dense infestation of pests. A lower flow rate is chosen if the infestation is mild or the crops are delicate.

Droplet size affects the travel of the spray between the sprayer and the vegetation or ground. Under optimal conditions, a spray of small droplets provides very even coverage over a given spray area. However, small droplets are more susceptible to spray drift, a condition whereby the droplets land outside of the intended spray area. Other factors that contribute to spray drift are travel speed of the sprayer, wind, humidity, ambient temperature, and sprayer height. Thus, droplet size is an important consideration when preparing to spray a field and is typically determined according to the type of chemical being sprayed, the crop being sprayed, and the aforementioned application conditions. Droplet sizes often range from 300 to 400 micrometers.

"Spray distribution" refers to the size of the spray area and the uniformity of the chemical over the spray area. Thus, spray distribution plays a significant role in the efficacy of a given application. Spray distribution is determined, in major part, by the spray pattern of each spray nozzle and the overlap of the spray patterns of adjacent nozzles.

The affect that the speed of the applying vehicle has on the density of the spray over the field is directly related, and inversely proportional, to the flow rate. For any given flow rate, an increase in vehicle speed will result in a decrease in spray density. Without a variable flow rate capability that uses vehicle speed as an entering argument, the spray density will vary as the vehicle climbs hills, makes turns, navigates tight areas, and encounters soft ground. Varying spray density adversely affects the environment, crop yields, chemical efficacy, and costs.

The importance of flow rate, droplet size, and spray distribution are well established. However, current spray systems do little to provide for the easy adjustment of these variables. Rather, a determination is made as to the optimal setting(s) for each variable prior to application, taking into consideration the aforementioned environmental factors and the characteristics of the individual field. Initial set up can be time consuming and is usually not modified until the entire field has been sprayed and a different field, having different requirements, needs to be sprayed. This practice has obvious shortcomings.

The flow rate for most available agricultural spray systems is held constant for a given application because each conventional nozzle lacks the capabilities to control droplet size and spray distribution, for a given spray pressure. In other words, with conventional nozzles, a decrease in flow rate is effected by decreasing the fluid pressure being supplied to the nozzle. A decrease in spray pressure results in an increase in droplet size and a decrease in the spray area for each given nozzle, thereby decreasing the spray distribution and the overlap between nozzles. The spray distribution is often so degraded that the adverse effects of varying the flow rate are worse than varying vehicle speed while maintaining a constant flow rate.

Nonetheless, for precision farming, it is desirable to vary the application density of agrochemicals according to potential yield, soil type, soil nutrients, soil moisture content, weeds, diseases, and field topography. Therefore, attempts at designing an effective variable flow rate nozzle have resulted in at least one commercially available product. U.S. Pat. No. 5,134,961 describes this product as employing a pulsed solenoid valve at the entrance of a conventional spray nozzle. By cycling the solenoid valves between open and closed positions, the system varies the effective flow rate of the system while maintaining a relatively constant fluid pressure. However, this system is expensive. Each spray nozzle is coupled to a separate solenoid valve while the whole spray boom is controlled by a complex control system. Additionally, despite the efforts to provide an effective variable flow rate system, the uniformity of the spray distribution nonetheless decreases dramatically as the flow rate decreases and travel speed increases, such as when it is desired to apply a light spray over a large area. Another design, described in U.S. Pat. No. 5,908,161, utilizes a metering rod and a housing to control the flow rate. One end of the metering rod has a special shape to control flow rate and to form a fan spray. Varying the position of the metering rod in the housing provides a varying flow rate. Varying spray pressure varies the position of the metering rod in the housing. The design is simple and provides a good control of flow rate. However, the resulting spray pattern of the nozzle is improper for typical overlapping broadcast applications and the droplet size is too fine for use during periods of strong winds.

It can thus be seen that a need remains for a system that allows a uniform dispersion of agrochemicals despite variances in vehicle speed. There is further a need that provides the capability of varying flow rate and dispersion density in a controlled manner while maintaining a desired droplet size and spray area. There is also a need for a variable flow rate system that is not cost prohibitive.

BRIEF SUMMARY OF THE INVENTION

The present invention provides a variable flow rate nozzle that is capable of controlling flow rate and maintaining proper spray pattern and droplet size over an expected range of flow rates. The nozzle uses a flexible spray tip that is automatically and appropriately deformed by a metering member in response to changes in fluid pressure within the nozzle. The deformation of the spray tip maintains a desired droplet size and spray pattern.

Though readily capable of manual control, the self-adjusting capability of the spray nozzle enables the creation of a fully automatic spray system. The spray system includes a computerized controller that receives inputs pertaining to vehicle speed, geographic vehicle position, and flow rate and/or fluid pressure. These inputs are compared against a predetermined flow plan for a given field and the controller automatically adjusts the flow rate to the nozzles accordingly. The flow rate adjustments made to the nozzles are not accompanied by a corresponding change in droplet size and spray area due to the self-adjusting nature of the nozzles.

In a preferred embodiment of the present invention there is provided a spray nozzle comprising a flexible spray tip defining a spray orifice, the flexible spray tip constructed and arranged to flex, thereby altering the shape of the spray orifice; a metering member in operable contact with the flexible spray tip and movable relative thereto, the metering member constructed and arranged to influence the flexible spray tip to flex in response to the relative movement between the metering member and the flexible spray tip; a driving assembly, including a biasing element such as a spring or an elastomeric piece, operably attached to the metering member; a nozzle body defining an interior chamber that houses at least portions of the driving assembly, the metering member, and the flexible spray tip, the nozzle body defining an inlet into through which fluid may enter the interior chamber of the nozzle body; wherein the nozzle body, driving assembly, metering member, and flexible spray tip, are arranged such that pressure changes in a fluid flowing through the interior chamber cause position changes in the driving assembly, thereby moving the metering member, thereby changing the influence the metering member has on the flexible spray tip, and thereby altering the shape of the spray orifice.

In another preferred embodiment, the flexible spray tip comprises: a flange; a spray shaping portion extending distally from the flange, the spray shaping portion defining a slot and the orifice therein; and, a pair of leveraging members extending proximally from the flange, the leveraging members capable of temporarily deforming the spray shaping portion when the leveraging members are flexed.

In another preferred embodiment, the metering member comprises a wedge-shaped tip to influence the flexible spray tip to flex in response to the relative movement between the metering member and the flexible spray tip.

In another preferred embodiment, the metering member comprises at least one flow groove defined by the metering member, the flow groove providing the metering member a metering capability.

In yet another preferred embodiment, a self-adjusting variable spray nozzle is provided comprising: a first means for shaping a stream of pressurized fluid; a second means for directing pressurized fluid into the first means; and a third means for adjusting the first means in response to the pressurized fluid.

Preferably, the first means for shaping a stream of pressurized fluid comprises a flexible spray tip defining a spray orifice, the flexible spray tip constructed and arranged to flex, thereby altering the shape of the spray orifice.

The second means for directing pressurized fluid into the first means preferably comprises a nozzle body defining an interior chamber and is in fluid communication with the spray tip, the nozzle body defining an inlet into through which fluid may enter the interior chamber of the nozzle body.

Preferably, the third means for adjusting the first means in response to the pressurized fluid comprises: a metering member in operable contact with the first means and movable relative thereto, the metering member constructed and arranged to influence the first means in response to the relative movement between the metering member and the first means; and, a driving assembly operably attached to the metering member, for sensing fluid pressure and imparting the relative movement to the metering member.

The spray system of the present invention preferably comprises: a tank; a pump, fluidly coupled to the tank and capable of taking suction thereon; at least one spray nozzle fluidly coupled to the pump; a flow sensor constructed and arranged to monitor an amount of fluid flowing to the at least one spray nozzle; a throttle valve fluidly connected between the pump, the at least one spray nozzle, and the tank, the throttle valve constructed and arranged such that, when opened, the throttle valve diverts fluid from the pump to the tank, thereby reducing flow to the at least one nozzle; a controller in data flow communication with the flow sensor; and, a vehicle speed sensor, such as a speedometer and/or a GPS receiver, in data flow communication with the controller; whereby the controller is constructed and arranged to determine whether flow to the at least one nozzle should be increased or decreased based on the inputs received from the flow sensor and the vehicle speed sensor.

In a preferred embodiment of the spray system, the throttle valve comprises a servo-motor constructed and arranged to throttle the throttle valve and further to receive commands from the controller, thereby giving the controller control over the position of the throttle valve. Also, the spray system preferably includes a GPS receiver in data flow communication with the controller, constructed and arranged to provide positioning data to the controller, the controller capable of being programmed with a flow plan having various flow rates that correspond to geographical areas, the controller thus able to compare positioning date from the GPS receiver to the flow plan and provide appropriate adjustment commands to the servo-motor of the throttle valve.

BRIEF DESCRIPTION OF THE DRAWINGS

FIGS. 1, 10 and 11 are sectional side elevation views of a preferred embodiment and two alternative embodiments of the spray nozzle of the present invention, respectively, each having different methods of attaching the flexible spray tip to the nozzle body, FIG. 2 is a sectional side elevation of a preferred embodiment of the spray tip of the present invention;

FIG. 3 is a rear elevation of a preferred embodiment of the spray tip of the present invention;

FIG. 4 is a perspective view of a preferred embodiment of the spray tip of the present invention;

FIG. 5 is a sectional side elevation of the spray tip of FIG. 2 in a flexed, low flow-rate configuration;

FIG. 6 is a plan view of a preferred embodiment of the metering member of the present invention;

FIG. 7 is a sectional side elevation of a preferred embodiment of the metering member of the present invention;

FIG. 8 is a diagrammatic representation of a preferred embodiment of an automatic spray system of the present invention; and, FIG. 9 is a diagrammatic representation of another preferred embodiment of an automatic spray system of the present invention.

DETAILED DESCRIPTION OF THE INVENTION

Referring to the drawings wherein like reference numerals identify similar structural elements of the device disclosed herein, there is illustrated in FIG. 1 the nozzle 10 of the present invention. The nozzle 10 generally includes a flexible spray tip 20, a nozzle body 40, a metering member 60, and a driving assembly 80.

Figure 2:
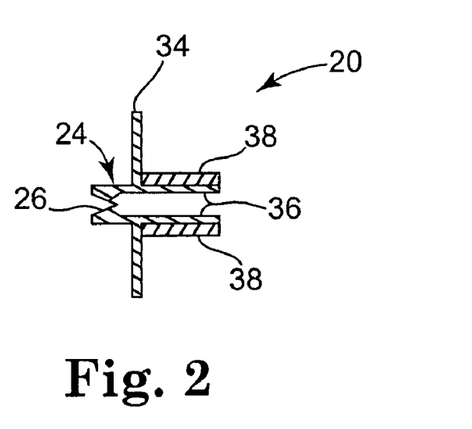
Figure 3:
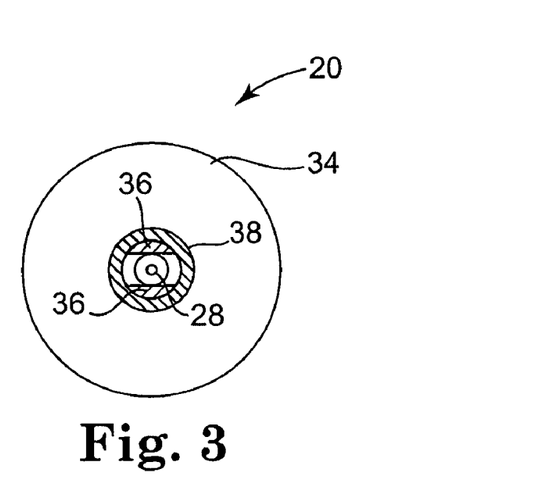
Figure 4:
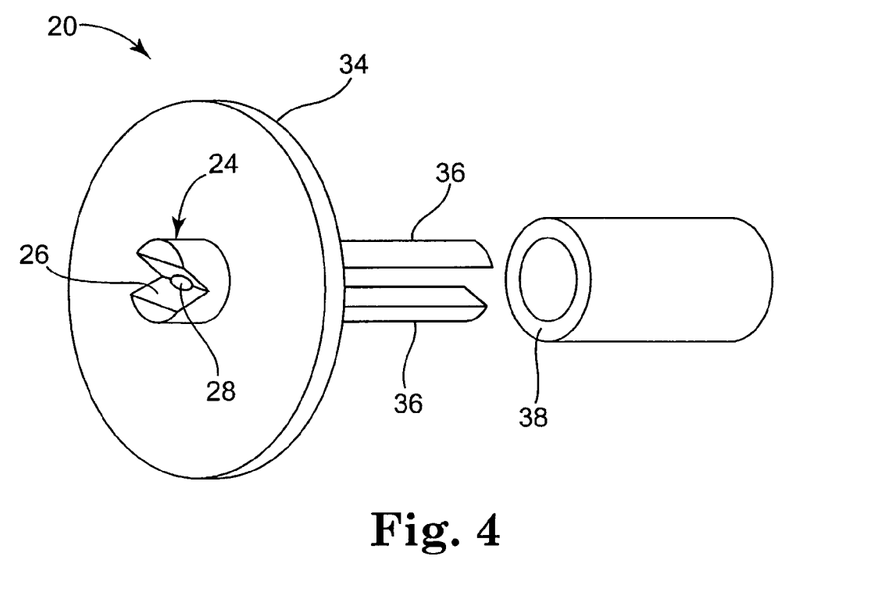

The spray tip 20 is operably attached to a nozzle body 40 for shaping a fluid stream emitted therefrom. Preferably, the spray tip 20 is held onto a distal end 42 of the nozzle body 40 with a spray tip cap 22, shown as being screwed onto the distal end 42 of the nozzle body 40. Alternatively, the spray tip 20 may be connected to the distal end 42 of the nozzle body 40 using a quick connect device, or the spray tip 20 may be molded onto the nozzle body 40. The spray tip 20 is constructed of a suitably flexible, non-soluble material. Best shown in FIGS. 2–4, the spray tip 20 includes a spray shaping portion 24 extending distally from a flange 34, and a pair of opposed, spaced apart leveraging members 36 extending proximally from the flange 34. The leveraging members 36 are preferably surrounded by a sealing band 38.

Figure 5:
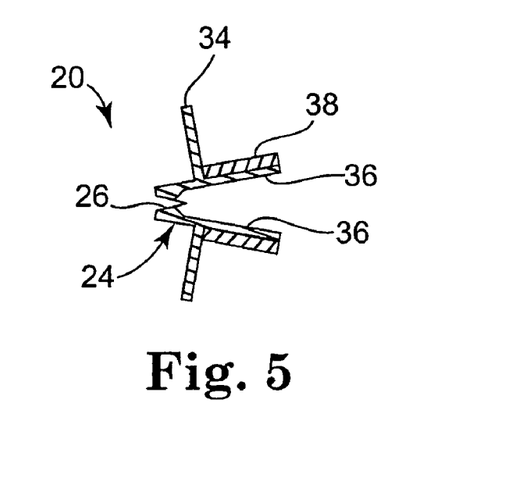

The spray shaping portion 24 includes a slot 26. The slot is preferably shaped like a V, though one skilled in the art will realize that various shapes for the slot 26 would also function adequately. For example, a U-slot, rectangular slot, or semi-circular slot would also provide spray-shaping capability. The angle of the slot 26 plays a role in determining the spray area of the resulting spray. At the center of the slot 26 is defined a spray orifice 28, which extends through the flange 34. The size and shape of the spray orifice 28 also plays a key role in defining various spray characteristics such as droplet size, spray area, and flow rate. The size and shape of the orifice 28, as well as the angle of the slot 26, are changeable by spreading the pair of opposed leveraging members 36. As best seen in FIG. 5, when the leveraging members 36 are spread, the angle of the slot 26 is reduced. The size of the spray orifice 28 is also reduced. When the leveraging members 36 are released, or the spreading force on the leveraging members 36 is lessened, the leveraging members 36 move toward each other to return to a more relaxed state. The sealing band 38 maintains a seal around the metering member 60 as the metering member 60 is projected between, and retracted from, the leveraging members 36.

As shown in FIG. 1, the flange 34 of the flexible spray tip 20 is used to create a fluid seal between the spray tip 20 and the distal end 42 of the nozzle body 40. Compressed against the distal end 42 with the spray tip cap 22, the flange forces pressurized fluid to escape the nozzle body 40 through the spray orifice 28. The nozzle body 40 thus defines an interior chamber 44 into which fluid enters through an inlet port 46, also defined by the nozzle body 40. The interior chamber 44 provides sufficient space to operably house the metering member 60, the leveraging members 36, the sealing band 38, as well as the driving assembly 80, and most importantly, the interior chamber 44 provides sufficient space to allow the leveraging members 36 to spread. The nozzle body 40 has a proximal end 48 that is shaped to receive the driving assembly 80. Specifically, the proximal end 48 includes a shoulder 50 that acts as a stop and a sealing point for the driving assembly 80.

Figure 6:
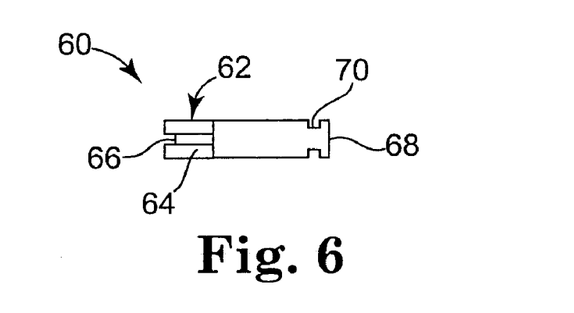
Figure 7:
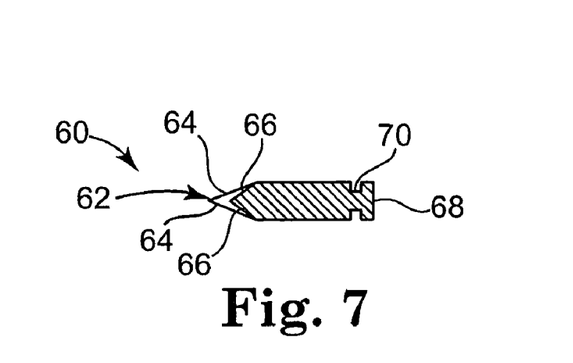
Figure 8:
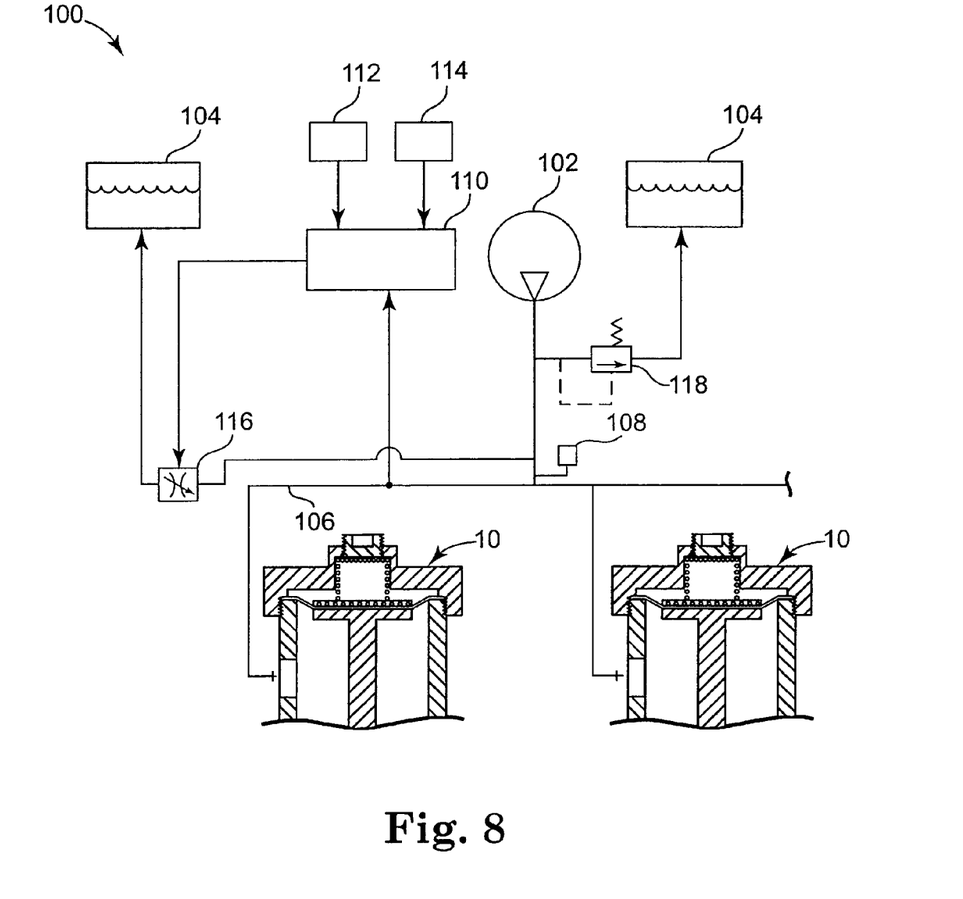
Figure 9:
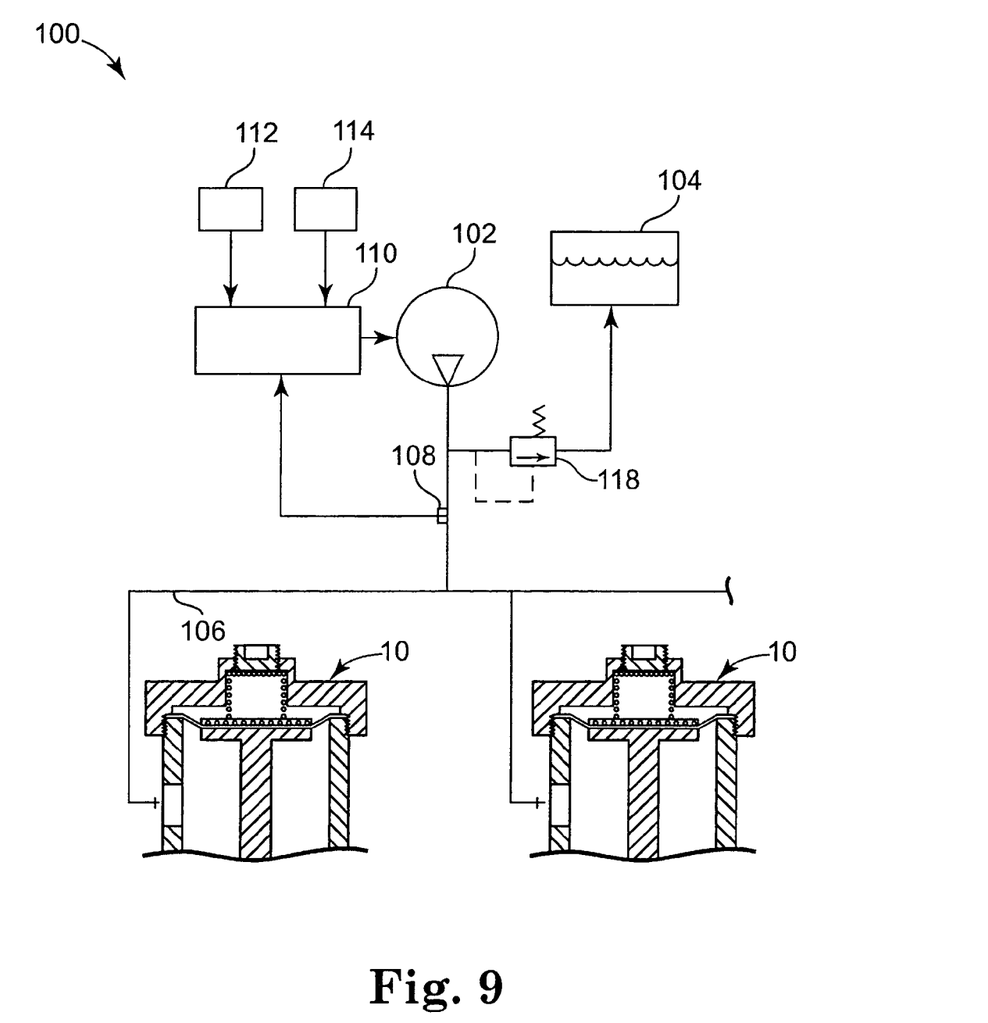
Figure 10:
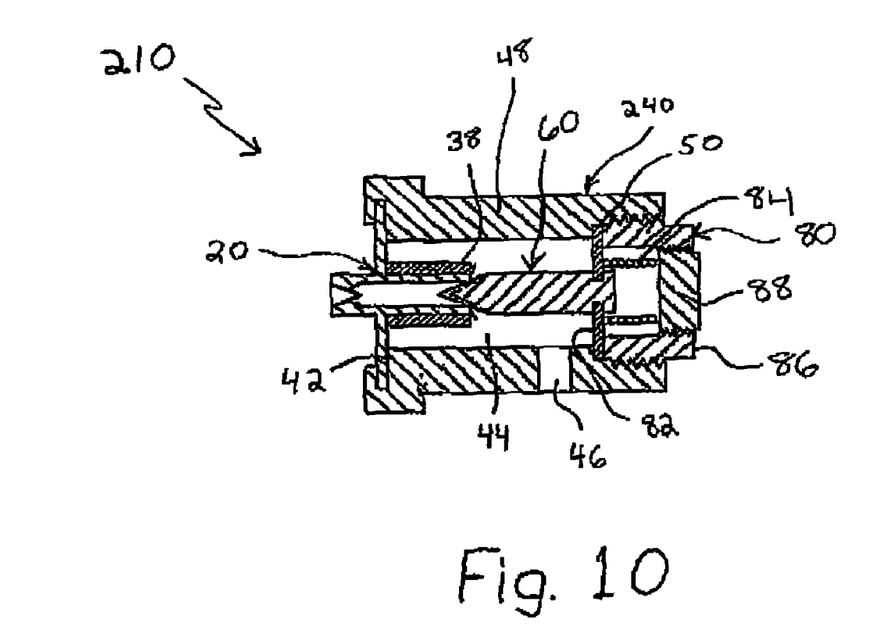
Figure 11:
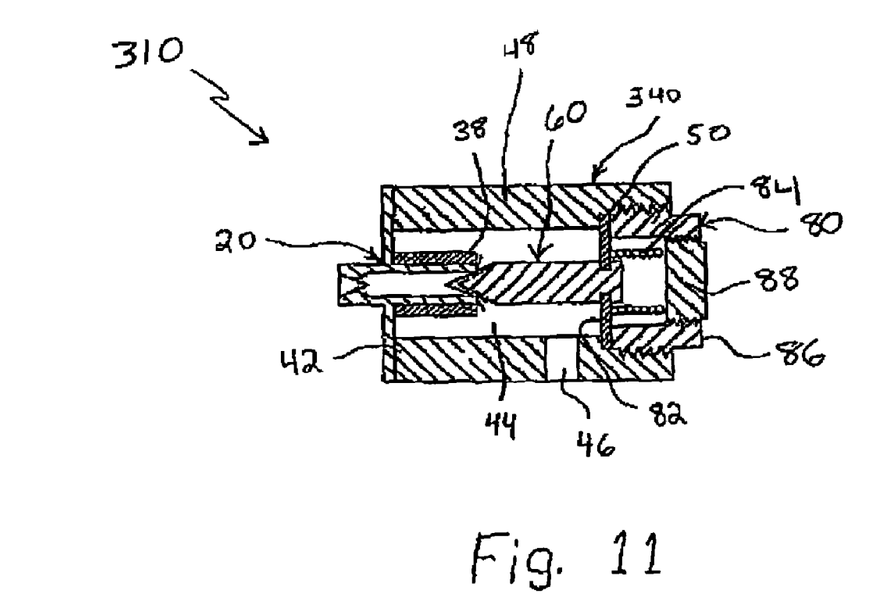

Referring now to FIG. 6–7, there is shown a preferred embodiment of a metering member 60 of the present invention. The metering member 60 serves the function of spreading the leveraging members 36 of the spray tip 20 apart and also providing a path for fluid to enter the spray-shaping portion 24 of the spray tip 20. The metering member 60 is a preferably rigid piece that includes a wedged distal tip 62. The wedged distal tip 62 has a pair of angled faces 64 that are each interrupted by a flow groove 66. The flow groove 66 ensures that a fluid path remains even when the wedged distal tip is pressed between the pair of leveraging members 36 and surrounded by the sealing band 38 of the flexible spray tip 20. In one embodiment, the flow groove 66 has a varying cross-sectional area such that as the metering member 60 is retracted, a larger flow area is provided. In another embodiment, the flow groove 66 has a constant cross-sectional area. At a proximal end 68 there exists an attachment means 70, the function of which is described below. The attachment means 70 is shown as a notch but a wide variety of attachment means would be just as effective. For example a flange would serve the purpose of attaching the metering member 60 to the driving assembly 80.

Referring back to FIG. 1, the driving assembly 80 is now described. The driving assembly 80 includes a flexible diaphragm 82 that is operably associated with the metering member 60. The flexible diaphragm 82 is compressed against the shoulder 50 of the nozzle body 40 by a driving assembly body 86, which is shown as threaded to the nozzle body 40 but may be welded, connected via quick-connect, or any other suitable means. The driving assembly body 86 is hollow and houses a biasing element 84, preferably a spring, proximal the diaphragm 82 and acting there against. The biasing element 84 is held in place between the diaphragm 82 and an adjustment plug 88, on a proximal side of the biasing element 84. The biasing element 84 could also be an elastomeric member, a pressure-controlled fluid, gas or even a mechanical linkage driven by a servo-motor.

Having described the components of the variable flow nozzle 10 of the present invention, it is now possible to describe its dynamic, self-adjusting nature. In operation, fluid enters the inlet port 46 under pressure. The fluid pressure acts against the inside surfaces of the interior chamber 44, which are all substantially rigid, and the flexible diaphragm 82. The diaphragm 82 resists deflection in a proximal direction with the assistance of the biasing element 84. The diaphragm 82 moves to a position where equilibrium is achieved between the force exerted by the biasing element 84, and any resilience exhibited by the diaphragm 82, and the fluid pressure. As the diaphragm 82 moves, the metering member 60 also moves as it is directly attached to the diaphragm 82. Movement of the metering member 60 results in a change in flexure of the leveraging members 36, and a corresponding change in the configuration of the spray tip orifice 28. Movement of the metering member 60 also results in a change in the configuration of the flow groove 66 of the metering member 60, as contact with the sealing band 38 is moved to a different location on the metering member 60 as well as a change in the angle with which the metering member 60 makes contact with the leveraging members 36.

Assuming equilibrium is achieved, a reduction in fluid pressure is now described. By way of example, a tractor employing the nozzles 10 of the present invention in a spraying operation slows. As the tractor slows, it is desired to reduce the fluid flow rate to avoid over-spraying. Thus, the fluid pressure of the supplied fluid is reduced, either automatically or manually. A reduction in fluid pressure allows the biasing element 84 to overcome the fluid pressure from a present position and move to a second position, in a distal direction, until equilibrium between the aforementioned forces is again achieved. The metering member 60 is also moved in a distal direction, toward the spray tip 20. The wedged distal tip 62 is pressed further in between the leveraging members 36 spreading them apart, while the sealing band 38 maintains a seal around the metering member 60, thereby forcing the fluid to enter the spray tip 20 through the flow grooves 66. Fluid communication is maintained between the spray tip 20 and the interior chamber 44 via the flow grooves 66 of the metering member 60. As the leveraging members 36 are spread, the spray orifice 28 is deformed to a smaller configuration, thereby increasing the velocity of the spray being emitted by the orifice 28 as well as maintaining the droplet size at a desired size. Without a decrease in orifice size, the spray velocity would decrease and the droplet size would increase. Further, to prevent a narrower spray area from resulting from the decreased flow rate the angle of the V-groove 26 is reduced slightly. By reducing the angle of the V-groove, the resulting spray angle is actually increased because fluid deflects off of the inner surfaces of the V-groove to define the spray angle. Thus, a narrower V-groove angle results in a wider spray angle as the deflection angle is increased. If the nozzle is properly tuned for the application, the spray area and droplet size will remain relatively constant despite changes in fluid pressure over an operable fluid pressure range. Thus, the nozzle 10 is self-adjusting.

Proper tuning is accomplished by using an appropriately sized biasing element 84 for a given application. Factors to consider include fluid viscosity and fluid pressure range. Once selected, fine-tuning is accomplished using the tuning plug 88 to increase or decrease the force the biasing element 84 places on the diaphragm 82.

As mentioned above, biasing element 84 could be a controlled fluid, gas, or motor-controlled linkage. In the gas embodiment, a compressible gas will provide a spring-like resistance so the replacement with a gas will operate in the aforementioned described manner. Preferably, the driving assembly of this embodiment includes a fitting into which the gas may be pumped into the void between the distal end of the nozzle body and the diaphragm, which is gas-tight.

In the fluid and motor embodiments, systems are provided, each having a feedback and control loop, whereby a fluid pressure in the interior chamber of the nozzle body 20 is detected and fed to a controller that determines necessary adjustments to the position of the metering member 60. The controller sends a signal to a hydraulic driving unit, in the case of the fluid embodiment, or a servo-motor, in the case of the motor embodiment, each of which move the metering member 60 appropriately.

The automatic adjusting capabilities of the nozzle 10 of the present invention makes possible a fully automatic spraying system. Referring to FIG. 8, there is shown a diagrammatic representation of an automatic spray system 100. The automatic spray system 100 includes a pump 102 that pumps fluid from a tank 104 to a boom 106 having one or more nozzles 10 attached thereto.

A sensor 108, operably attached between the boom 106 and the pump 102, monitors the fluid passing through the boom 106 and sends a signal back to a controller 110, preferably a computer. The sensor 108 may be either a flow meter that measures the amount of fluid flowing through to the boom, or a fluid pressure sensor. The controller 110 also receives speed input from the speed sensor 112 of the vehicle, and, optionally, an input from a GPS receiver 114. The speed sensor 112 may be a direct input from the vehicle, such as one measuring wheel revolutions to drive a speedometer, or a common system such as a radar system employed on many farm vehicles. The GPS receiver 114 may provide such data as speed, position, and elevation. Using the speed, position, and flow rate inputs, the controller 110 can make adjustments to the flow rate by closing or opening a servo-operated throttle valve 116. A reduction in flow rate is achieved by opening the throttle valve 116, thereby diverting more fluid back to the tank 104. A relief valve 118 is also provided downstream of the pump 102, which diverts fluid back to the tank 104 in the event of an over-pressure situation.

Optimizing the use of the computer controller 110, a flow plan can be programmed into the controller 110 that is customized for a given field. The flow plan should include a planned desired base speed, for use later in comparison to actual speed so adjustments may be made to flow rate. Using a computerized map of the field, a farmer is able to highlight areas of desired increased or decreased agrochemical application. Once the flow plan is entered, the computer controller 110 compares positioning data received from the GPS receiver 114 to the desired flow rate uploaded into the map. If the desired flow rate does not match the actual flow rate data received from the flow meter 108, an adjustment to the throttle valve 116 is made. Also, speed is continually monitored as received by the GPS and/or the speed sensor 112 and adjustments are made to flow rate, again by throttling the throttle valve 116.

More complicated plans can be uploaded into the controller 110 that account for other factors such as wind, boom height, sunlight and water received by the crops, variations in insect infestation, etc. For example, one area of the field may be protected from the wind while another area may not be. Adjustments may be made to the flow plan to accommodate for changes in expected wind conditions.

Additionally, the aforementioned system 100 was described as being fully automatic. However, a less expensive system could be developed whereby complete control over the throttle valve 116 is given to the operator of the vehicle. The controller 110 would thus be used to provide flow rate feedback to the operator of the vehicle so adjustments to guide throttle valve adjustments.

FIG. 9 shows an embodiment of the system 100 whereby the throttle valve 116 of the embodiment in FIG. 8 has been eliminated in favor of a variable speed pump 102, preferably a centrifugal pump. The controller 110 thus adjusts the speed of the pump 102 in response to the input it receives from the sensor 108, the speed sensor 112 and/or the GPS receiver 114.

The invention has herein been described in its preferred embodiments to provide those skilled in the art with the information needed to apply the novel principles and to construct and use the embodiments of the examples as required. However, it is to be understood that the invention can be carried out by specifically different devices and that various modifications can be accomplished without departing from the scope of the invention itself which is set out in the following claims:

While the nozzle 10 of the present invention has been described in considerable detail, FIGS. 10 and 11 depict two alternative embodiments. FIG. 10 illustrates nozzle 210 which is substantially similar to the previously described nozzle, however, simply has flexible spray tip 20 molded into nozzle body 240. Similarly, FIG. 11 illustrates nozzle 310, which utilizes a slightly different attachment methodology. Specifically, flexible spray tip 20 is simply welded to nozzle body 340 forming a fluid tight seal there between.

What is claimed is:

1. A spray nozzle comprising:

a flexible spray tip defining a spray orifice, the flexible spray tip constructed and arranged to flex, thereby altering the shape of the spray orifice, the flexible spray tip further comprising a flange; a spray shaping portion extending distally from the flange, the spray shaping portion defining a slot and the orifice therein; and, a pair of leveraging members extending proximally from the flange, the leveraging members capable of temporarily deforming the spray-shaping portion when the leveraging members are flexed;

a metering member in operable contact with leveraging members of the flexible spray tip and movable relative thereto, the metering member constructed and arranged to spread the leveraging members apart and to influence the flexible spray tip to flex in response to the relative movement between the metering member and the flexible spray tip;

a driving assembly operably attached to the metering member; and, a nozzle body defining an interior chamber that houses at least portions of the driving assembly, the metering member, and the flexible spray tip, the nozzle body defining an inlet into through which fluid may enter the interior chamber of the nozzle body;

wherein the nozzle body, driving assembly, metering member, and flexible spray tip, are arranged such that pressure changes in a fluid flowing through the interior chamber cause position changes in the driving assembly, thereby moving the metering member, thereby changing the influence the metering member has on the flexible spray tip, and thereby altering the shape of the spray orifice.

2. The spray nozzle of claim 1 further comprising a spray tip cap, the flexible spray tip being molded to the spray cap, the spray cap operably attached to a distal end of the nozzle body.

3. The spray nozzle of claim 2 wherein the spray tip cap is connected to the distal end of the nozzle body with a quick-connect mechanism.

4. The spray nozzle of claim 1 wherein the metering member comprises a wedge-shaped tip to spread the leveraging members apart and to influence the flexible spray tip to flex in response to the relative movement between the metering member and the flexible spray tip.

5. The spray nozzle of claim 1 wherein the metering member comprises at least one flow groove defined by the metering member, the flow groove providing the metering member a metering capability.

6. The spray nozzle of claim 1 wherein the driving assembly comprises a spring.

7. The spray nozzle of claim 1 wherein the driving assembly comprises an elastomeric member.

8. The spray nozzle of claim 7 further comprising a nozzle body cap constructed and arranged to hold the elastomeric member against a proximal end of the nozzle body.

9. The spray nozzle of claim 1 wherein the nozzle body comprises external threads on a distal end of the nozzle body.

10. The spray nozzle of claim 1 wherein the nozzle body comprises at least a part of a quick-connect mechanism.

11. The spray nozzle of claim 9 further comprising a spray tip cap threaded to mate with the threads on the distal end of the nozzle body, and constructed and arranged to compress a flange of the spray tip cap against the distal end of the nozzle body.

12. The spray nozzle of claim 10 further comprising a spray tip cap configured with at least part of a quick disconnect system that is configured to interact with the at least part of a quick-connect mechanism of the nozzle body.

13. The spray nozzle of claim 1 further comprising a spray tip cap constructed and arranged to hold the spray tip against a distal end of the nozzle body.

* * * * *